United States Patent
Amorosi et al.

(10) Patent No.: US 9,896,190 B1
(45) Date of Patent: Feb. 20, 2018

(54) WING LEADING EDGE ARCHITECTURE SUITABLE FOR LAMINAR FLOW

(71) Applicant: The Boeing Company, Chicago, IL (US)

(72) Inventors: Stephen R. Amorosi, Seattle, WA (US); Gregory M. Santini, Bothell, WA (US); Matthew Leroy Anderson, Carnation, WA (US); Steve C. Hinrichs, Cypress, CA (US); Walter J. Jarecki, Long Beach, CA (US); Nicholas I. Bennett, Seattle, WA (US); Quang Minh Pham, Westminister, CA (US); Paul Hungwai Lai, Arcadia, CA (US); Gregory E. Rupert, Rossmoor, CA (US); Carl F. Osaki, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 816 days.

(21) Appl. No.: 14/271,477

(22) Filed: May 7, 2014

(51) Int. Cl.
| | | |
|---|---|---|
| *B64C 21/02* | (2006.01) | |
| *B64C 3/14* | (2006.01) | |
| *B64C 9/24* | (2006.01) | |
| *B64C 9/34* | (2006.01) | |
| *B64D 15/04* | (2006.01) | |

(52) U.S. Cl.
CPC ............... *B64C 21/02* (2013.01); *B64C 3/14* (2013.01); *B64C 9/24* (2013.01); *B64C 9/34* (2013.01); *B64D 15/04* (2013.01); *B64C 2003/143* (2013.01); *B64C 2003/146* (2013.01)

(58) Field of Classification Search
CPC ....... B64C 2009/143; B64C 9/22; B64C 9/24; B64C 23/00; B64C 21/00; B64C 2230/00; B64C 21/02; B64C 3/14; Y02T 50/166
See application file for complete search history.

(56) References Cited

U.S. PATENT DOCUMENTS

| | | | | |
|---|---|---|---|---|
| 3,889,903 A | * | 6/1975 | Hilby | B64C 21/04 244/124 |
| 3,910,530 A | * | 10/1975 | James | B64C 9/22 244/207 |
| 3,941,334 A | * | 3/1976 | Cole | B64C 9/24 244/214 |
| 4,099,691 A | * | 7/1978 | Swanson | B64C 21/04 244/134 B |

(Continued)

FOREIGN PATENT DOCUMENTS

| | | | | |
|---|---|---|---|---|
| EP | 2886452 A1 | * | 6/2015 | ............... B64C 5/06 |
| EP | 2955108 A1 | * | 12/2015 | ............... B64C 5/06 |

*Primary Examiner* — Benjamin P Lee
(74) *Attorney, Agent, or Firm* — Ostranger Chong Flaherty & Broitman P.C.

(57) ABSTRACT

A wing leading edge architecture designed to enable laminar flow on passenger jets or other aircraft. The embodiments disclosed herein comprise a metallic fixed leading edge skin panel that is bonded to internal support structure without fasteners except for limited fastening along side edge portions adjacent to side edge portions of adjacent leading edge skin panels and along an aft edge portion overlapping a wing skin. In addition, the embodiments disclosed herein integrate a low-drag bleed-air anti-icing (i.e., vent) system and a Krueger flap assembly (e.g., a two-position, high-height, variable-camber Krueger flap assembly).

18 Claims, 10 Drawing Sheets

(56) References Cited

U.S. PATENT DOCUMENTS

| | | | | |
|---|---|---|---|---|
| 4,159,089 A * | 6/1979 | Cole | B64C 9/24 | 244/214 |
| 4,285,482 A * | 8/1981 | Lewis | B64C 9/22 | 244/207 |
| 4,427,168 A * | 1/1984 | McKinney | B64C 3/48 | 244/214 |
| 4,553,722 A * | 11/1985 | Cole | B64C 3/48 | 244/214 |
| 4,752,049 A * | 6/1988 | Cole | B64D 15/04 | 244/134 B |
| 4,770,607 A * | 9/1988 | Cycon | B64C 23/00 | 416/20 R |
| 4,813,631 A * | 3/1989 | Gratzer | B64C 9/146 | 244/209 |
| 5,098,037 A * | 3/1992 | Leffel | B64D 15/166 | 244/134 A |
| 5,114,100 A * | 5/1992 | Rudolph | B64C 21/06 | 244/130 |
| 5,695,154 A * | 12/1997 | Castellucci | B64C 23/00 | 244/130 |
| 6,129,314 A * | 10/2000 | Giamati | B64D 15/00 | 244/134 A |
| 6,283,411 B1 * | 9/2001 | Giamati | B64D 15/12 | 244/134 A |
| 6,467,730 B2 * | 10/2002 | Laugt | B64D 15/04 | 244/123.14 |
| 7,278,610 B2 * | 10/2007 | Giamati | B64C 9/24 | 244/134 D |
| 7,546,980 B2 * | 6/2009 | Giamati | B64C 9/24 | 244/134 D |
| 7,578,484 B2 * | 8/2009 | Fox | B64C 9/22 | 244/214 |
| 7,992,822 B2 * | 8/2011 | Kato | B64C 3/28 | 244/123.1 |
| 8,245,972 B2 * | 8/2012 | Capasso | B32B 3/12 | 244/123.1 |
| 8,282,042 B2 * | 10/2012 | Parikh | B64C 1/12 | 244/130 |
| 8,844,869 B2 * | 9/2014 | Andre | B64C 1/26 | 244/119 |
| 8,925,870 B1 * | 1/2015 | Gordon | B64C 3/28 | 244/200 |
| 8,998,144 B2 * | 4/2015 | Boone | B64D 15/12 | 244/134 A |
| 2007/0194179 A1 * | 8/2007 | Giamati | B64C 9/24 | 244/134 D |
| 2008/0121758 A1 * | 5/2008 | Hernandez | B64C 7/00 | 244/130 |
| 2008/0258008 A1 * | 10/2008 | Cooper | B64C 1/12 | 244/131 |
| 2012/0037760 A1 * | 2/2012 | Koppelman | B64C 21/06 | 244/209 |
| 2013/0270392 A1 * | 10/2013 | Derqui | B64C 23/00 | 244/130 |
| 2014/0131520 A1 * | 5/2014 | Boone | B64D 15/12 | 244/134 D |
| 2015/0183513 A1 * | 7/2015 | Gerber | B64C 5/06 | 244/130 |
| 2016/0068250 A1 * | 3/2016 | Meyer | B64C 3/14 | 244/123.1 |
| 2016/0244143 A1 * | 8/2016 | Foster | B64C 3/26 | |

\* cited by examiner

WING LEADING EDGE ARCHITECTURE SUITABLE FOR LAMINAR FLOW

BACKGROUND

This disclosure relates to aircraft boundary-layer flow-control systems, and more specifically, to methods and apparatus for encouraging laminar flow along the surface of an airfoil or body.

Laminar flow along a surface of an airfoil is typically achieved by reducing the magnitude of disturbances and instabilities in the boundary-layer. By keeping these fluctuations small, the nonlinear interactions leading to turbulence can be curtailed and/or delayed. Currently, the most robust methods for controlling the disturbance amplitudes are based on modifying the boundary-layer mean flow via airfoil geometry (i.e., by tailoring the pressure gradient) or by applying surface suction. Since modifications to the pressure gradient do not actively consume power, this approach has been termed "natural laminar flow". The successful application of this approach and attainment of drag reduction benefits has been demonstrated both theoretically and in testing for nominally two-dimensional boundary layers.

Surface discontinuities may disrupt the laminar boundary layer of air over an airfoil (e.g., an aircraft wing) and cause it to become turbulent. A turbulent boundary layer may be characterized by increased mixing between layers of air within the boundary layer. The drag caused by a turbulent boundary layer may be as much as 5 to 10 times greater than the drag of a laminar boundary layer. This transition from laminar flow to turbulent flow within the boundary layer may increase drag. Also, this transition may produce undesirable noise, decrease fuel efficiency, and/or other undesirable effects during flight. These discontinuities may be caused by, for example, without limitation, steps and/or gaps in joints between wing skin panels and/or steps and/or waviness due to fasteners that extend through the skin panels and fasten the panels to the wingbox.

It is well known that systems incorporated in an airfoil for other purposes may contribute to turbulent flow. For example, anti-icing systems are widely used for the prevention of ice buildup on leading edges of aircraft structures. It is known to install a bleed-air wing anti-icing or de-icing system near the leading edge of a wing. The incorporation of an anti-icing system in a wing leading edge may adversely affect airflow in the boundary layer.

In addition, modern aircraft may use a variety of high-lift leading and trailing edge devices to improve high-angle of attack performance during various phases of flight, including takeoff and landing. Existing leading edge devices include leading edge slats and Krueger flaps. Krueger flaps have generally the same function as leading edge slats, but rather than retracting aft to form the leading edge of the cruise wing, Krueger flaps are hinged, and typically fold into the lower surface of the wing when stowed. When deployed, Krueger flaps extend forward from the under surface of the wing, increasing the wing camber and maximum coefficient of lift. In the case of a typical Krueger flap, a slot or gap is created between the flap and the wing as the flap is extended forward. During certain operating conditions, air can flow through this slot to energize the airflow over the upper surface of the wing, and improve overall airflow characteristics over the wing. A two-position, high-height, variable-camber Krueger flap assembly is disclosed in U.S. patent application Ser. No. 13/867,562, the disclosure of which is incorporated by reference herein in its entirety.

A wing leading edge structure that encourages laminar flow, integrates a bleed-air anti-icing system, and further integrates a two-position, high-height, variable-camber Krueger flap would be useful.

SUMMARY

The subject matter disclosed herein is a wing leading edge architecture designed to enable laminar flow on passenger jets and other aircraft. The embodiments disclosed herein comprise a metallic fixed leading edge skin panel that is bonded or welded to internal support structure with limited use of fasteners along side edge portions and along an aft edge portion overlapping an upper wing skin. In addition, the embodiments disclosed herein integrate a low-drag bleed-air anti-icing (i.e., vent) system and a Krueger flap assembly (e.g., a two-position, high-height, variable-camber Krueger flap assembly).

As used hereinafter, the term "fixedly coupled" means joined by any means other than bonding or welding (e.g., fastening), while the term "connected" means joined by bonding or welding.

One aspect of the subject matter disclosed in detail below is a wing assembly comprising: a spar; an upper wing skin joined to the spar, the upper wing skin comprising a forward extension that extends forward of the spar and includes a mating surface offset from a surface of the upper wing skin; a first rib fixedly coupled to and projecting forward from the spar; a fixed leading edge skin panel fixedly coupled to the first rib, wherein the fixed leading edge skin panel comprises an upper portion having an aft edge portion that overlaps the forward extension such that a surface of the fixed leading edge skin panel is level with the surface of the upper wing skin. This wing assembly may further comprise first and second pluralities of fasteners disposed along left and right side edges respectively of the upper portion of the fixed leading edge skin panel, and a third plurality of fasteners disposed along an aft edge of an upper portion of the fixed leading edge skin panel.

The wing assembly described in the preceding paragraph may further comprise one or more of the following elements: (1) a shim disposed between the aft edge portion of the upper portion of the fixed leading edge skin panel and the forward extension of the upper wing skin. (2) an insert made of polymeric material, the insert being disposed in a space bounded by an aft edge of the aft edge portion of the upper portion of the fixed leading edge skin panel, the forward extension of the upper wing skin, and an offset wall of the upper wing skin; (3) a clip comprising a vertical portion fixedly coupled to the first rib and a horizontal portion fixedly coupled to the forward extension of the upper wing skin; (4) a stiffener member fixedly coupled to the first rib and connected to the upper portion of the fixed leading edge skin panel, wherein the stiffener member comprises a web and a flange which meet at an intersection, the flange being tapered on both sides of the intersection; and (5) an upper chord connected to the upper portion of the fixed leading edge skin panel, wherein the upper chord comprises a web and a flange which meet at an intersection, the flange being tapered on both sides of the intersection.

In accordance with one embodiment, the wing assembly described above further comprises an upper chord connected to the upper portion of the fixed leading edge skin panel, a lower chord connected to a lower portion of the fixed leading edge skin panel, a nose beam web fixedly coupled to the upper and lower chords, and a plurality of vents formed by the lower portion of the fixed leading edge skin panel and the lower chord. The first rib is fixedly coupled to the nose beam web. The lower chord comprises a plurality of channels, the vents being formed by the channels and opposing portions of the lower portion of the fixed leading edge skin panel. The fixed leading edge skin panel and the nose beam web define a cavity in fluid communication with the vents, the wing assembly further comprising a duct in fluid communication with the cavity and a source of hot air. This embodiment further comprises: a second rib fixedly coupled to the spar, to the nose beam web, and to the fixed leading edge skin panel; first and second bridge fittings fixedly coupled to and extending between the first and second ribs; and a Krueger flap assembly pivotably coupled to the first and second ribs. The Krueger flap assembly comprises a movable lower leading edge skin panel and a mechanism that abuts the first bridge fitting when the movable lower leading edge panel is in an extended position and abuts the second bridge fitting when the movable lower leading edge skin panel is in a retracted position. The lower chord has a cutout for clearance with the mechanism of the Krueger flap assembly when the movable lower leading edge skin panel is in the extended position.

Another aspect of the subject matter disclosed in detail below is a wing assembly comprising: a fixed leading edge skin panel comprising upper and lower portions; and a bulkhead connected to the upper and lower portions of the fixed leading edge skin panel to define a cavity, wherein the bulkhead comprises a lower flange connected to the lower portion of the fixed leading edge skin panel, which lower flange comprises a plurality of channels for venting air from the cavity. The bulkhead may comprise an upper chord connected to the upper portion of the fixed leading edge skin panel, a lower chord connected to the lower portion of the fixed leading edge skin panel, and a nose beam web fixedly coupled to the upper and lower chords, wherein the lower flange is part of the lower chord. This wing assembly may further comprise: first and second ribs fixedly coupled to the bulkhead; and a Krueger flap assembly pivotably coupled to the first and second ribs. The Krueger flap assembly comprises a movable lower leading edge skin panel having a forward portion that overlaps an aft portion of the lower chord when the movable lower leading edge skin panel is in a retracted position, and a mechanism capable of moving the movable lower leading edge skin panel from the retracted position to an extended position in response to actuation. An aft edge of the lower portion of the fixed leading edge skin panel is separated from a forward edge of the movable lower leading edge skin panel by a gap when the movable lower leading edge skin panel is in the retracted position, the gap being in fluid communication with the plurality of channels.

A further aspect is a wing assembly comprising: a spar; first and second ribs fixedly coupled to and projecting forward from the spar; a fixed leading edge skin panel comprising upper and lower portions; and means for stiffening the wing assembly, the means for stiffening being connected to the fixed leading edge skin panel and fixedly coupled to the first and second ribs. The means for stiffening may be made of metal or honeycomb core. This wing assembly may further comprise an upper chord connected to the upper portion of the fixed leading edge skin panel, a lower chord connected to a lower portion of the fixed leading edge skin panel, and a nose beam web fixedly coupled to the upper and lower chords and to the first and second ribs. In accordance with one embodiment, the upper chord comprises a web and a flange which meet at an intersection, the flange being tapered on both sides of the intersection. Again the wing assembly may further comprise a Krueger flap assembly pivotably coupled to the first and second ribs. This Krueger flap assembly comprises: a movable lower leading edge skin panel having a forward portion that overlaps an aft portion of the lower chord when the movable lower leading edge skin panel is in a retracted position; and a mechanism capable of moving the movable lower leading edge skin panel from the retracted position to an extended position in response to actuation.

Other aspects of wing assemblies suitable for laminar flow are disclosed below.

BRIEF DESCRIPTION OF THE DRAWINGS

Reference will hereinafter be made to the drawings in which similar elements in different drawings bear the same reference numerals.

DETAILED DESCRIPTION

Various illustrative embodiments of wing leading edge assemblies that encourage laminar flow will now be described in detail. In accordance with the embodiments disclosed in detail below, a metallic fixed leading edge skin panel is provided that has one or more of the following features: (1) the metallic fixed leading edge skin panel is bonded to internal support structure and overlaps a wing skin; (2) the metallic fixed leading edge skin panel integrates a low-drag bleed-air vent system; and (3) the metallic fixed leading edge skin panel integrates a Krueger flap assembly.

Laminar flow has tighter wing contour, waviness and step requirements than on current passenger jets. A key requirement is to minimize the number of fasteners that protrude through the external leading edge skin to reduce steps and waviness.

Figure 1:
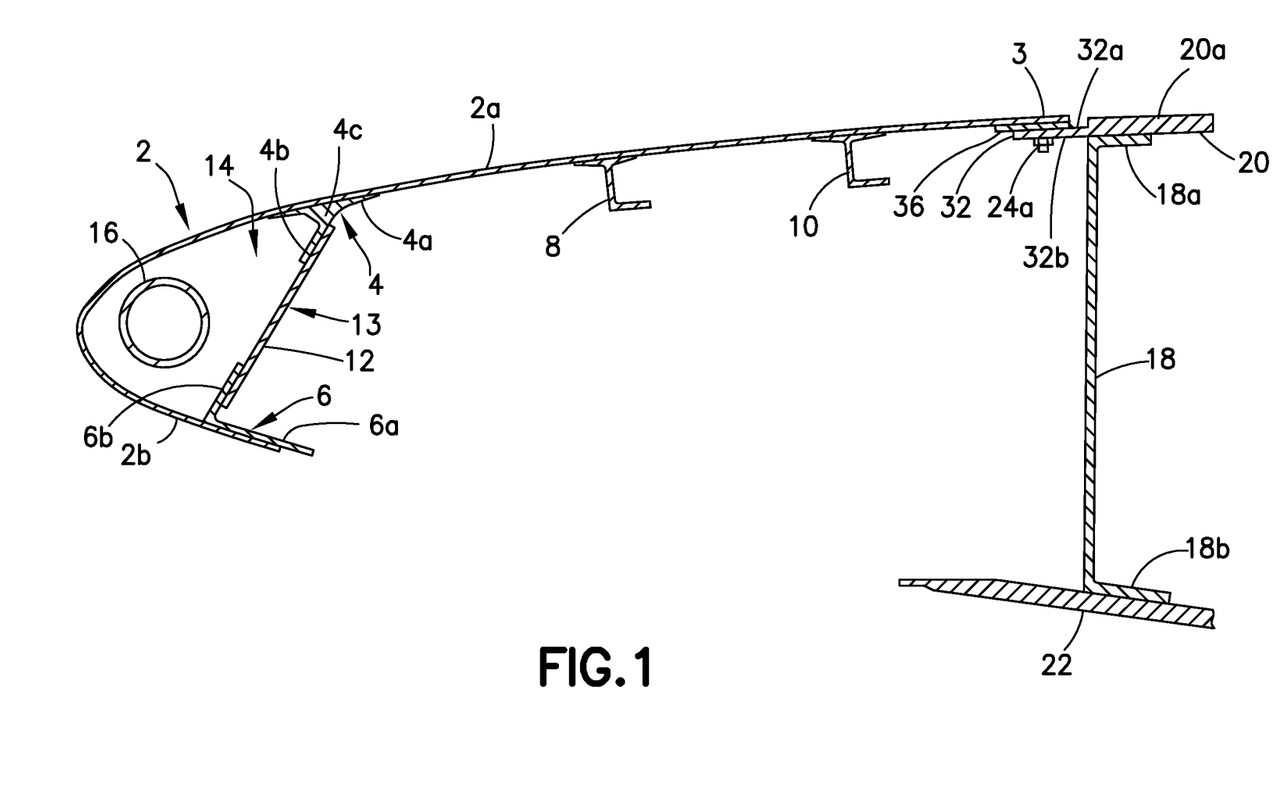
FIG. 1 is a diagram showing a sectional view of some components and portions of other components of a wing assembly comprising a spar, an upper wing skin, and a smooth bonded metallic leading edge skin panel affixed to and overlapping the upper wing skin.

FIG. 1 is a diagram showing a sectional view of some components and portions of other components of a wing assembly in accordance with one embodiment. Some components of the wing assembly, such as ribs and a Krueger flap assembly pivotably coupled to those ribs, are not shown.

More specifically, FIG. 1 shows one embodiment of a minimal-fastener wing leading edge assembly comprising a metallic fixed leading edge skin panel 2 which is bonded to a metallic sub-structure. In accordance with this embodiment, the metallic sub-structure comprises an upper chord 4, a lower chord 6, and a pair of L-shaped stiffener members 8, 10. Metal bonding is standard practice, but the specific implementation described herein is new. The upper chord 4 and the stiffener members 8, 10 each comprise a flange (e.g., flange 4a of upper chord 4) having tapered edges and a web (e.g., web 4b of upper chord 4) which meet at a thick intersection (e.g., intersection 4c of upper chord 4), which geometry minimizes the bond stresses. The fixed leading edge skin panel 2 is moderately thicker than conventional leading edge skin panels to provide deflection control.

Figure 4:
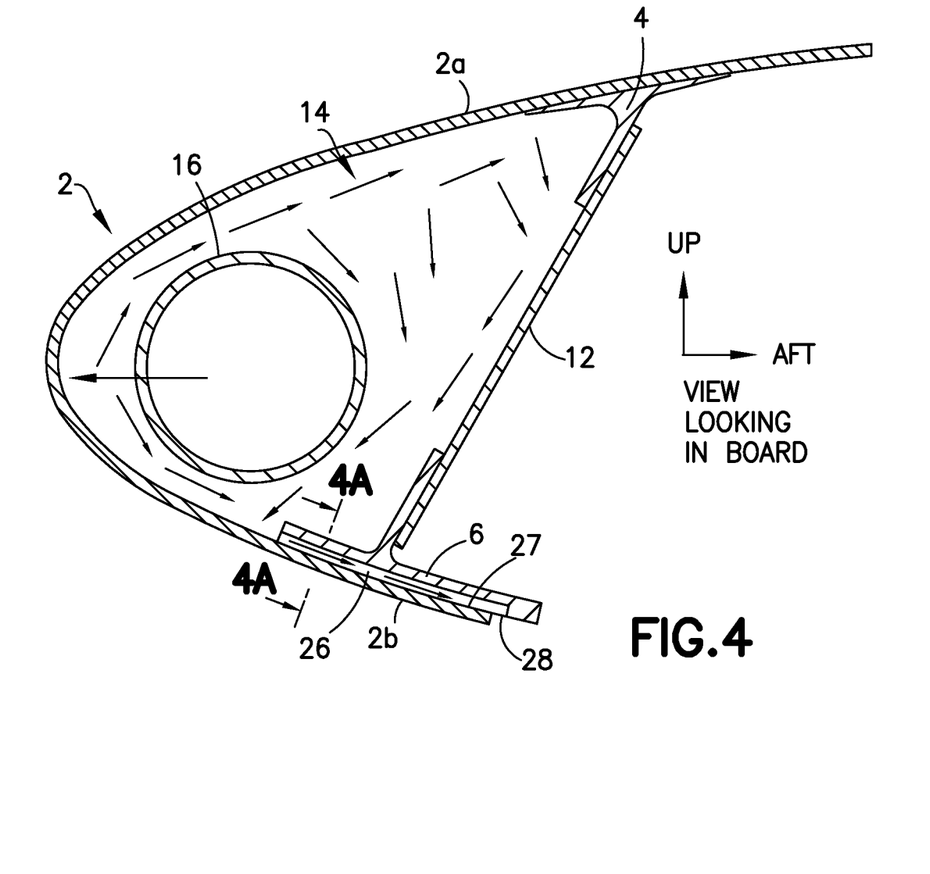
FIG. 4 is a diagram showing a sectional view of a forward portion of a leading edge assembly incorporating a low-drag bleed-air anti-icing (i.e., vent) system.

Still referring to FIG. 1, the upper chord 4 and stiffener members 8, 10 are bonded to an upper portion 2a of fixed leading edge skin panel 2, whereas the lower chord 6 is bonded to a lower portion 2b of fixed leading edge skin panel 2 and extends beyond an aft edge of that lower portion. The lower chord 6 may be L-shaped, as seen in FIG. 1, or inverted T-shaped (e.g., ⊥-shaped), as seen in FIG. 4. A nose beam web 12 is fastened by a multiplicity of fasteners 30 to the webs of upper chord 4 and lower chord 6 to form a bulkhead (e.g., forward bulkhead 13) that defines a cavity 14 in the forwardmost portion of the leading edge assembly. A bleed-air duct 16 is disposed within the cavity 14. The bleed-air duct 16 is in fluid communication with a source of hot bleed air (not shown), e.g., an aircraft engine. The bleed-air duct 16 has one or more openings (not shown) that allow hot bleed air inside the duct to escape into the cavity 14 for use in de-icing surfaces, (e.g., the lower surface of the wind leading edge assembly), as will be described in more detail later with reference to FIGS. 4 and 5.

The fixed leading edge skin panel 2, upper chord 4, lower chord 6, stiffener members 8, 10, and nose web beam 12 (as well as ribs 40, 42 seen in FIG. 8) are made of materials that have very similar coefficients of thermal expansion, which minimizes thermally-induced deflections (e.g., all aluminum or all titanium work better than assembly of aluminum and titanium parts).

An alternate approach to metal bonding is to weld the upper chord 4 and stiffener members 8, 10 using a process that has minimal impact on the outer surface, such as friction stir welding, soldering or brazing. Another alternate approach is to use honeycomb core in place of stiffener members. With honeycomb core, the fixed leading edge skin panels may have a variable thickness, using conventional or chemical milling. An embodiment having honeycomb core will be described in more detail later with reference to FIG. 11.

The wing assembly partly depicted in FIG. 1 further comprises a front spar 18, an upper wing skin 20 joined to an upper portion 18a of the front spar 18, and a lower wing skin 22 joined to a lower portion 18b of the front spar 18. The wing assembly may further include ribs, which are fixedly coupled to and extend between the nose beam web 12 and the front spar 18 (not shown in FIG. 1 for clarity, but see rib 42 in FIG. 7 and ribs 40, 42 in FIG. 8, as examples).

As seen in FIG. 1, the upper wing skin 20 is connected to an upper portion of the front spar 18 and includes a forward extension 32 that extends forward of the front spar 18. The forward extension 32 and the aft edge portion 3 of the upper portion 2a of fixed leading edge skin panel 2 are coupled to each other by a row of fasteners 24a, only one fastener of which is visible in FIG. 1.

Figure 2:
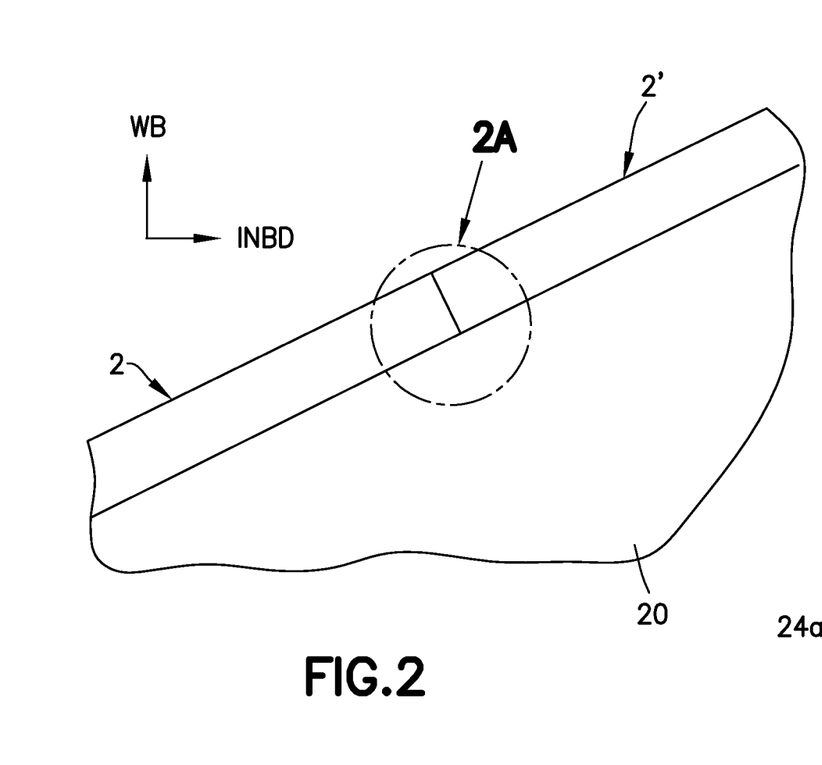
FIG. 2 is a diagram showing a top view of a portion of a wing assembly incorporating a plurality of leading edge skin panels having fasteners along adjacent side edge portions and along respective aft edge portions that overlap the wing skin.
Figure 2A:
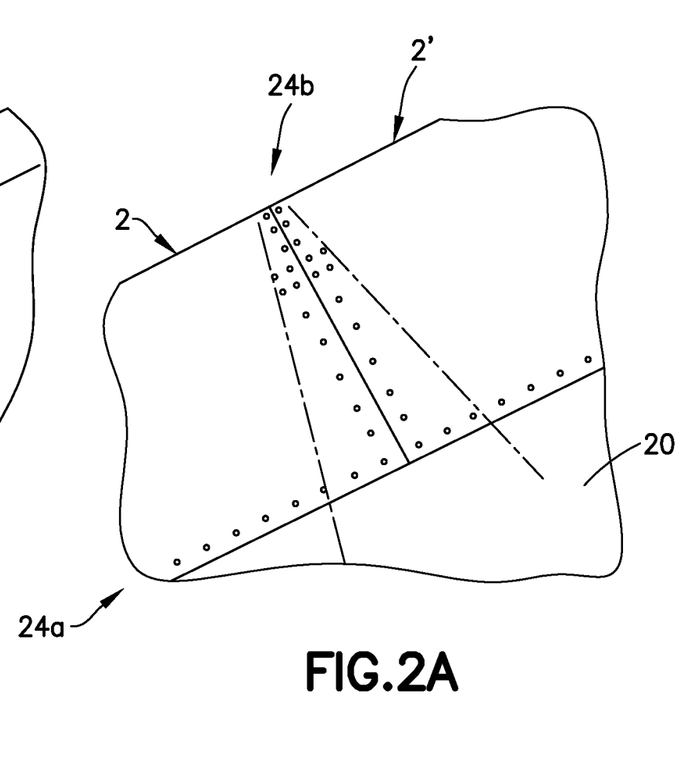
FIG. 2A is a diagram showing a top view (on a magnified scale) of the portion of the wing assembly inside an area 2A indicated in FIG. 2.

A plurality of fixed leading edge skin panels may be arranged side-by-side along the leading edge of a wing. Each fixed leading edge skin panel 2 is fastened (e.g., bolted) at both ends (hereinafter "side edge portions") and along the aft edge portion. FIG. 2 shows a first fixed leading edge skin panel 2 adjacent to a second fixed leading edge skin panel 2'. Fixed leading edge skin panels 2 and 2' have respectively rows of fasteners 24b along respective side edge portions and respective rows of fasteners 24a along respective aft edge portions that overlap the wing skin 20. FIG. 2A shows a top view (on a magnified scale) of the portion of the wing assembly inside an area 2A indicated in FIG. 2. Referring to FIG. 2A, the aft edge portions of the fixed leading edge skin panels 2 and 2' and the forward extension 32 of the upper wing skin 20 are fixedly coupled to the sub-structure by means of fasteners 24a. The side edge portions of the fixed leading edge skin panels 2 and 2' are fixedly coupled to the sub-structure by fasteners 24b. The occasional rows of fasteners 24b will create a turbulent zone (i.e., a turbulent flow cone, as indicated by two diverging dashed-dotted lines in FIG. 2A) that results in increased drag, but this is deemed an acceptable laminar flow compromise to enable an easily buildable and safe design. Specifically regarding safety, a stiffener member or upper chord bond failure will be contained (but is detectable) by the bolted structure at the ends of fixed leading edge skin panels.

Figure 3A:
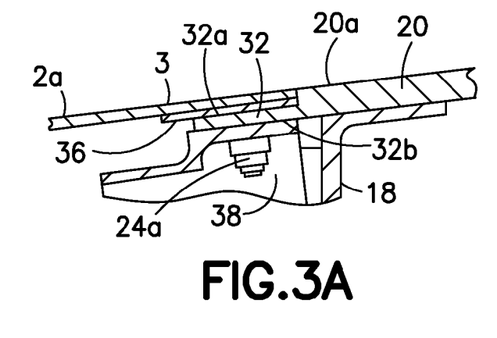
FIG. 3A is a diagram showing a sectional view of a lap joint at an aft edge portion of the leading edge skin panel depicted in FIG. 1 in accordance with one embodiment.

Another novel feature is the over-spar joint design shown in FIG. 1 and shown in more detail in FIG. 3A. The forward extension 32 of the upper wing skin 20 includes a mating surface 32a and an inner surface 32b, the mating surface 32a being offset from an aerodynamic surface 20a of the upper wing skin 20, which offset enables an aft edge portion 3 of the upper portion 2a of fixed leading edge skin panel 2 to overlap the forward extension 32 in a way (including shimming if needed) such that the aerodynamic surface of the upper portion 2a of the fixed leading edge skin panel 2 and the aerodynamic surface 20a of the upper wing skin 20 will be level with each other. This joint design minimizes the aerodynamic steps, enabling laminar flow to cross the joint, by overlapping the fixed leading edge skin panel 2 onto the upper wing skin 20 in a simple and stiff lap joint.

In accordance with the joint design shown in FIG. 3A, a shim 36 may be inserted between the aft edge portion 3 of the fixed leading edge skin panel 2 and the forward extension 32 of the upper wing skin 20. For example, shim 36 may have a thickness equal, for example, to the difference between the thickness of the aft edge portion 3 of the fixed leading edge skin panel 2 and the height of the offset of the forward extension 32 from the surface of the upper wing skin 20.

Figure 3B:
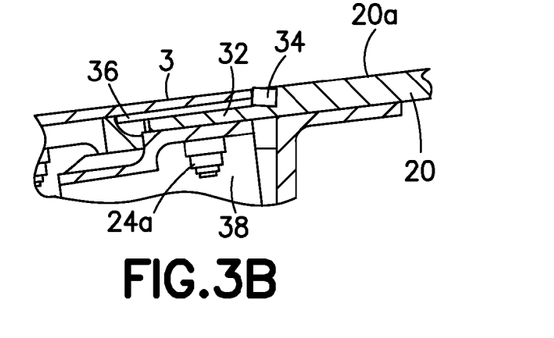
FIG. 3B is a diagram showing a sectional view of a lap joint at an aft edge portion of the leading edge skin panel depicted in FIG. 1 in accordance with an alternative embodiment.

Furthermore, in the joint configuration shown in FIG. 3B, a shaved insert 34 (made, e.g., of high-performance plastic, carbon-filled epoxy, aluminum-filled epoxy, or other filler) is used for manufacturing tolerance pay-off. In the joint configuration shown in FIG. 3A, the skins are built with sufficient accuracy to avoid the insert.

Another feature of the joint designs shown in FIGS. 3A and 3B is a clip 38 installed below the lap joint which, when removed, allows a pre-assembled fixed leading edge assembly to be installed onto an assembled wing box. In addition, this design allows systems to be installed on the front spar 18 prior to leading edge installation.

Figure 4A:
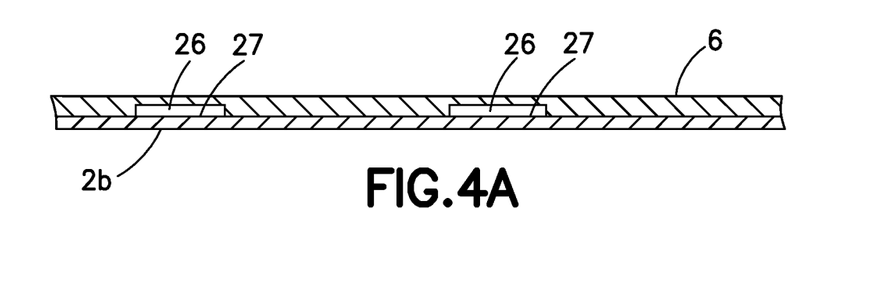
FIG. 4A is a diagram showing a sectional view of the vent system partly depicted in FIG. 4, the section being taken along line 4A-4A indicated in FIG. 4.

FIG. 4 shows a sectional view of a forward portion of a leading edge assembly incorporating a low-drag bleed-air wing anti-icing or de-icing system. This bleed-air wing anti-icing system is integrated with the fixed leading edge skin panel 2 in a way to minimize the impact on the aerodynamic surface. Traditionally bleed-air holes are formed on a wing lower surface. Instead, the fixed leading edge assembly shown in FIG. 4 is designed with a multiplicity of vents 28 formed by respective channels 26 in the flange of the lower chord 6 and/or in the confronting inner surface 27 of the lower portion 2b of the fixed leading edge skin panel 2. FIG. 4A shows a sectional view of the vent system partly depicted in FIG. 4, the section being taken along line 4A-4A indicated in FIG. 4. Each channel 26 in the flange of lower chord 6 partly defines a respective vent 28. In accordance with one embodiment shown in FIG. 5, the channels 26 in the lower chord 6 are spaced apart and mutually parallel.

Figure 5:
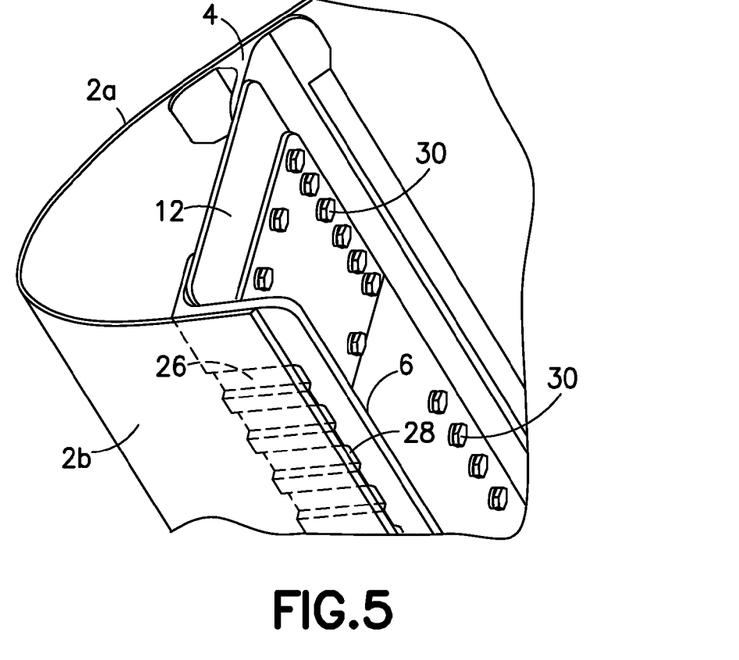
FIG. 5 is a diagram showing an isometric view of a forward portion of a leading edge assembly incorporating a vent system.

Referring again to FIG. 4, the aft outlets of vents 28 formed by channels 26 and the confronting inner surface of the lower portion 2b of the fixed leading edge skin panel 2 are in fluid communication with the ambient atmosphere by way of a gap between the fixed and movable leading edge skin panels (this gap is not shown in FIGS. 4 and 5). More specifically, this design bleeds the air through vents 28 and the air exits through a gap 48 (shown in FIG. 11) between the aft edge of the lower portion 2b of the fixed leading edge skin panel 2 and the forward edge of the movable leading edge skin panel 52, which is part of the Krueger flap (discussed in detail below). This design provides more heated surface area on the lower wing surface and more ice removal. In addition, it may provide some ice removal on the surface of the moveable leading edge skin panel 52.

In accordance with a further aspect, the wing leading edge assembly integrates a two-position, high-height, variable-camber Krueger flap assembly of the type described in detail in U.S. patent application Ser. No. 13/867,562. One embodiment of such a wing leading edge assembly will now be described in more detail herein with reference to FIGS. 6-9.

Figure 6:
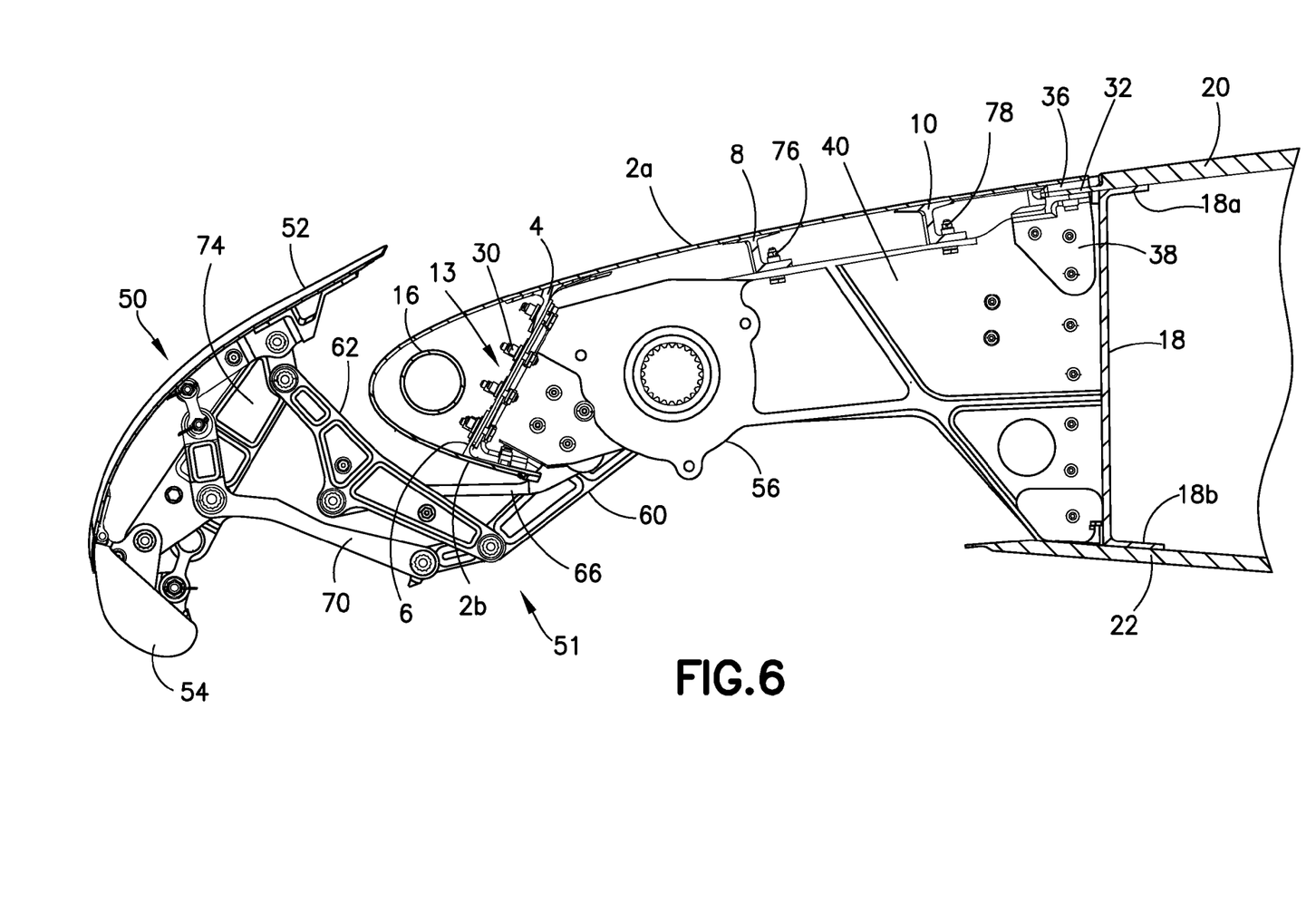
FIG. 6 is a diagram showing a side view of a wing leading edge assembly incorporating a Krueger flap assembly. The Krueger flap is shown in an extended position.
Figure 7:
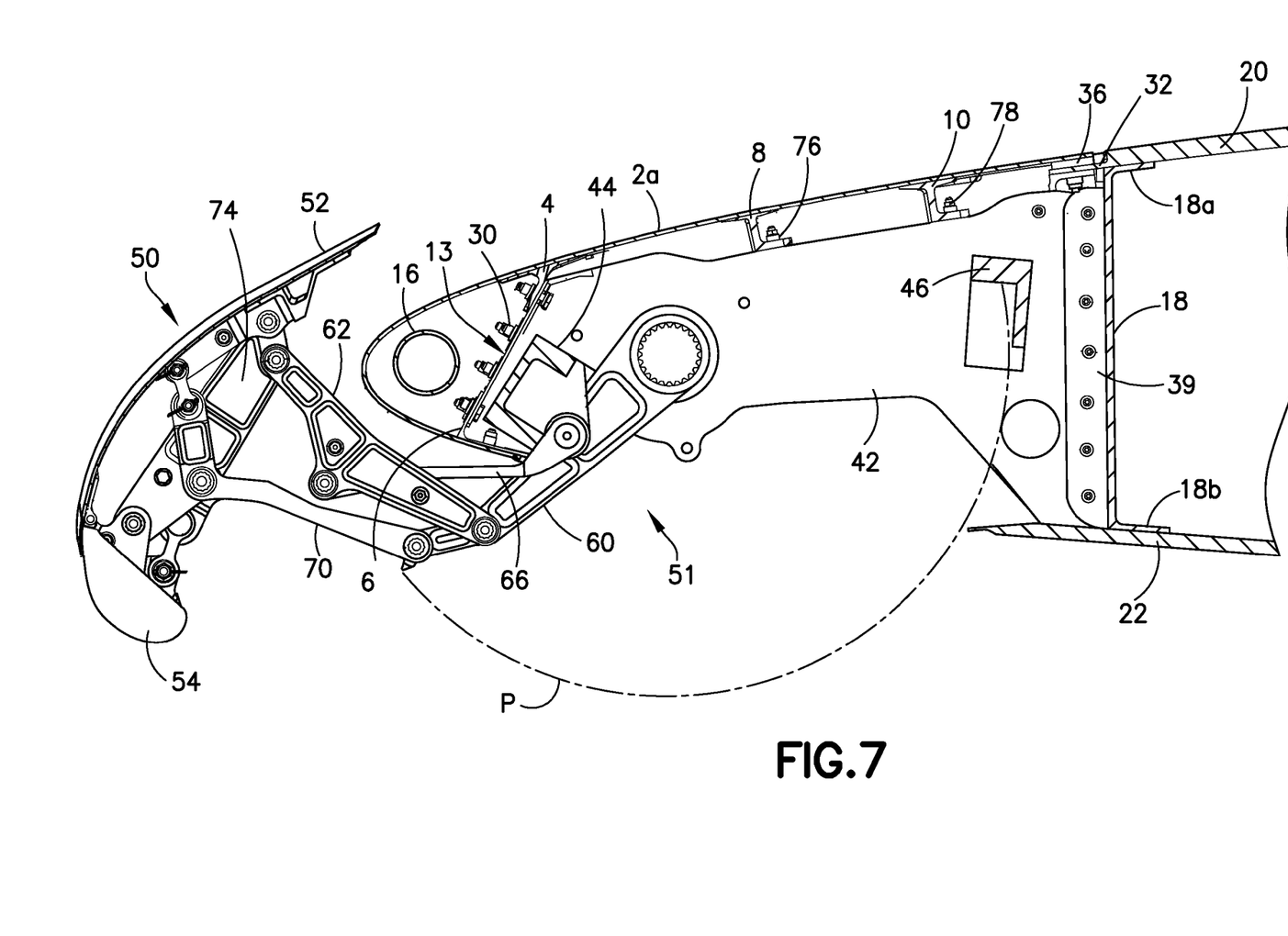
FIG. 7 is a diagram showing a side view of the wing leading edge assembly depicted in FIG. 6 after the removal of a rib.
Figure 8:
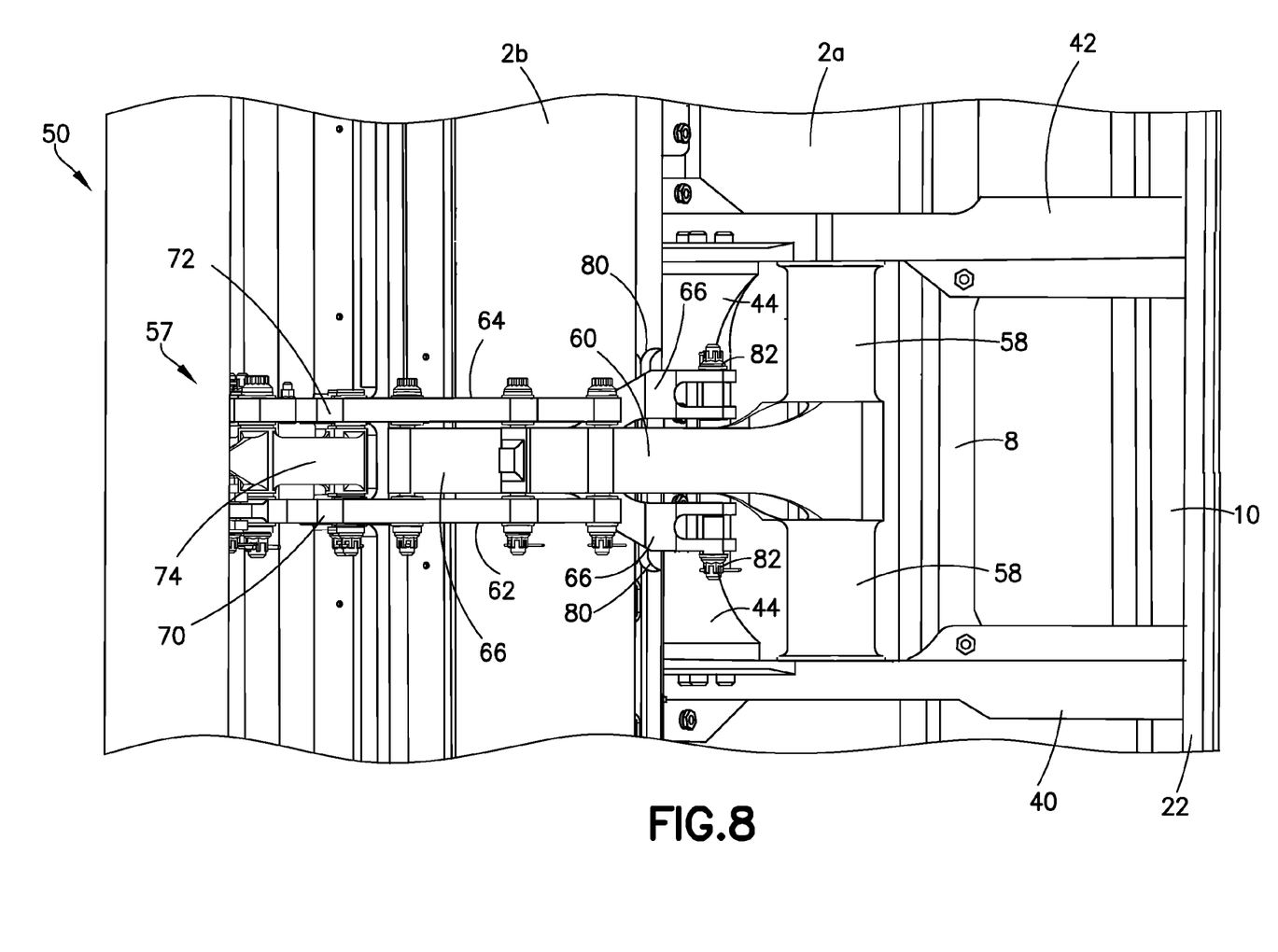
FIG. 8 is a diagram showing a bottom view of the wing leading edge assembly depicted in FIG. 6.
Figure 9:
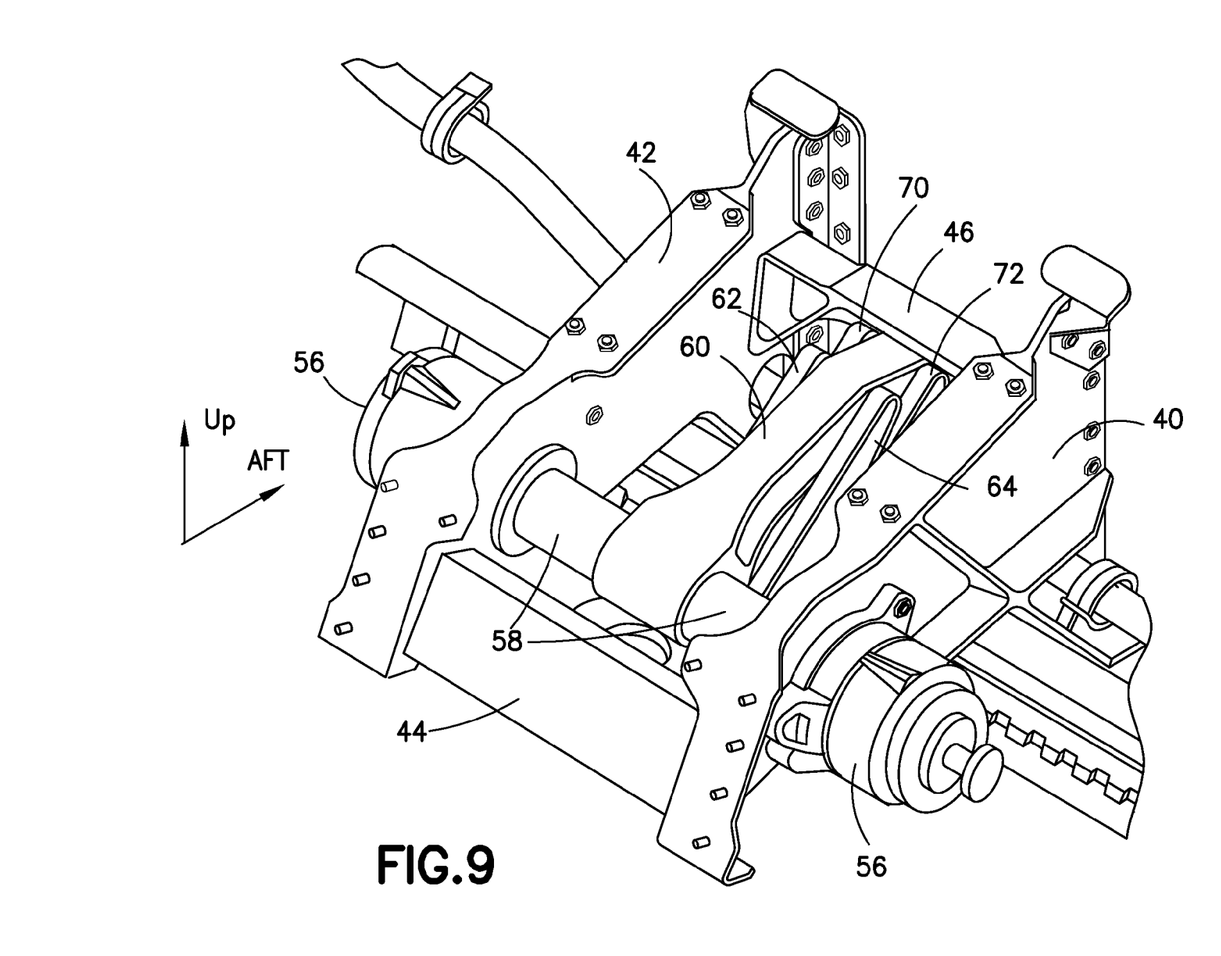
FIGS. 9 and 10 are diagrams showing respective isometric views of some components of the Krueger flap assembly depicted in FIGS. 6 and 8.

FIG. 6 shows a cross-sectional view of a wing leading edge assembly when the Krueger flap is an extended (i.e., deployed) position. A rib 40 is visible in the forefront of FIG. 6, while a second rib 42 is hidden behind rib 40. FIG. 7 shows an alternate cross-sectional view taken along the same cross section line as in FIG. 6 but after the removal of rib 40, thereby exposing rib 42. FIG. 9 is an isometric view showing that ribs 40, 42 are connected by a forward bridge fitting 44 and an aft bridge fitting 46. Only forward bridge fitting 44 is visible in the bottom view of FIG. 8, which is partial detail view of the wing leading edge assembly of FIG. 6 from a bottom vantage point looking upward. The bridge fittings 44, /46 are also visible in section in FIG. 7.

Referring again to FIG. 6, the ribs 40, 42 are fixedly coupled to the stiffener members 8, 10 by one or more fasteners, (e.g., fasteners 76, 78 respectively). The ribs 40, 42 are also fixedly coupled to the nose beam web 12, to the front spar 18 (by respective rib-spar clips 39), and to the forward extension 32 of the upper wing skin 20 (by respective corner clips 38). Each of the corner clips 38 (only one of which is visible in FIG. 6) has a first portion fastened to a respective rib 40, 42 and a second portion fastened to the forward extension 32 of the upper wing skin 20. Each of the rib-spar clips 39 (only one of which is visible in FIG. 7) has a first portion fastened to a respective rib 40, 42 and a second portion fastened to the front spar 18.

As best seen in FIGS. 6 and 7, the Krueger flap assembly comprises a Krueger flap 50 and a Krueger flap deployment mechanism 51. The Krueger flap 50 comprises an assembly of components, including (but not limited to) a movable lower leading edge skin panel 52, a bullnose member 54 and a flap link 74. In addition to altering aerodynamic performance of the wing when deployed, the Krueger flap 50 protects the leading edge of the wing (i.e., fixed upper leading edge skin panel 2) from bugs and debris encountered at lower altitudes.

The Krueger flap deployment mechanism 51 comprises a drive arm 60 integrated with a pair of torque tubes 58 (see FIG. 8) having splines on their inside diameters, and a pair of geared rotary actuators 56 (see FIG. 9) that provide torque for rotating the drive arm 60 to deploy or retract the Krueger flap 50. In accordance with one embodiment, the geared rotary actuators 56 are planetary gearboxes.

When the drive arm 60 rotates clockwise (from the vantage point of FIG. 7), the Krueger flap 50 moves from a retracted state (not shown in the drawings) to the deployed state shown in FIG. 7. The Krueger flap 50 stops extending when the drive arm 60 abuts the forward bridge fitting 44, which functions as a deploy drive arm stop. In contrast, when the drive arm 60 rotates counterclockwise (from the vantage point of FIG. 7), the Krueger flap 50 moves from the deployed state to the retracted state. The Krueger flap 50 stops retracting when the tip of drive arm 60 abuts the aft bridge fitting 46, which functions as a retract drive arm stop. (During retraction, the tip of drive arm 60 follows a path P indicated by a dashed arc in FIG. 7.) The lower chord 6 is provided with cutouts 80 (two of which are shown in FIG. 8). Each cutout 80 provides clearance space for a respective support arm 66 to allow full deployment of the Krueger flap 50. In this manner the lower chord 6 is configured to enable the support arm 66 to pivot to an angular position whereat the drive arm 60 abuts the forward bridge fitting 44.

Figure 10:
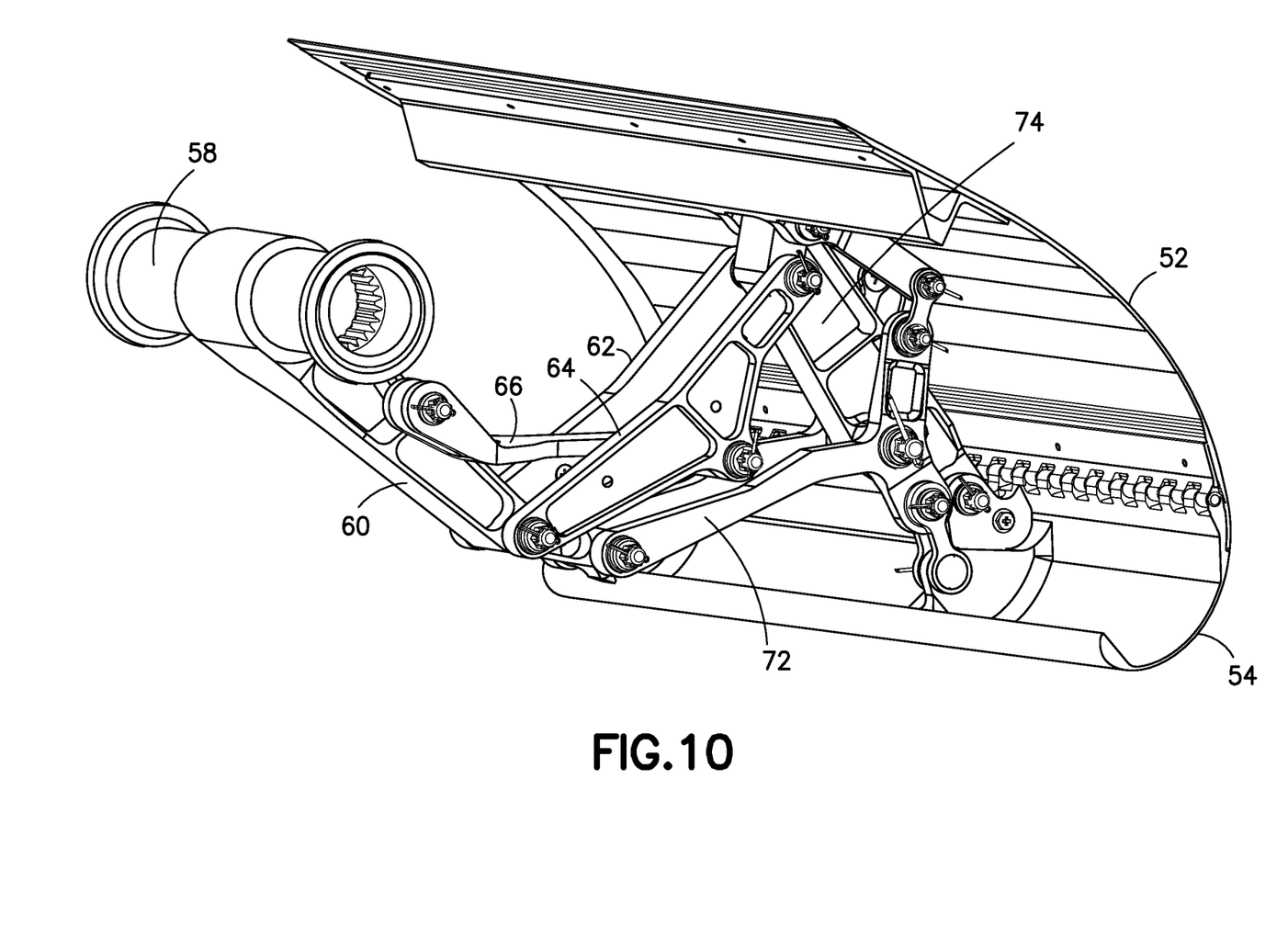

The Krueger flap deployment mechanism 51 further comprises a linkage assembly that couples the flap link 74 of Krueger flap 50 to the drive arm 60. This linkage assembly may be of the type described in detail in U.S. patent application Ser. No. 13/867,562. As best seen in FIGS. 7, 8 and 10, such a linkage assembly comprises: a pair of drive links 62, 64 having respective ends pivotably coupled to an intermediate portion of drive arm 60 and respective ends pivotably coupled to flap link 74 near one end thereof; a yoke-shaped support arm 66 pivotably coupled by a pair of rotation joints 82 (on opposite sides of drive arm 60) to forward bridge fitting 44 and having a distal end pivotably coupled to respective intermediate portions of drive links 62, 64; and a pair of drive transfer arms 70, 72 having respective ends pivotably coupled to a distal end of drive arm 60 and respective intermediate portions pivotably coupled to an intermediate portion of flap link 74. (For the avoidance of doubt, the distal end of support arm 66 seen in FIG. 8 does not extend to or contact the flap link 74.) Further details concerning the structure and operation of the Krueger flap assembly are depicted in FIGS. 6-10.

Figure 11:
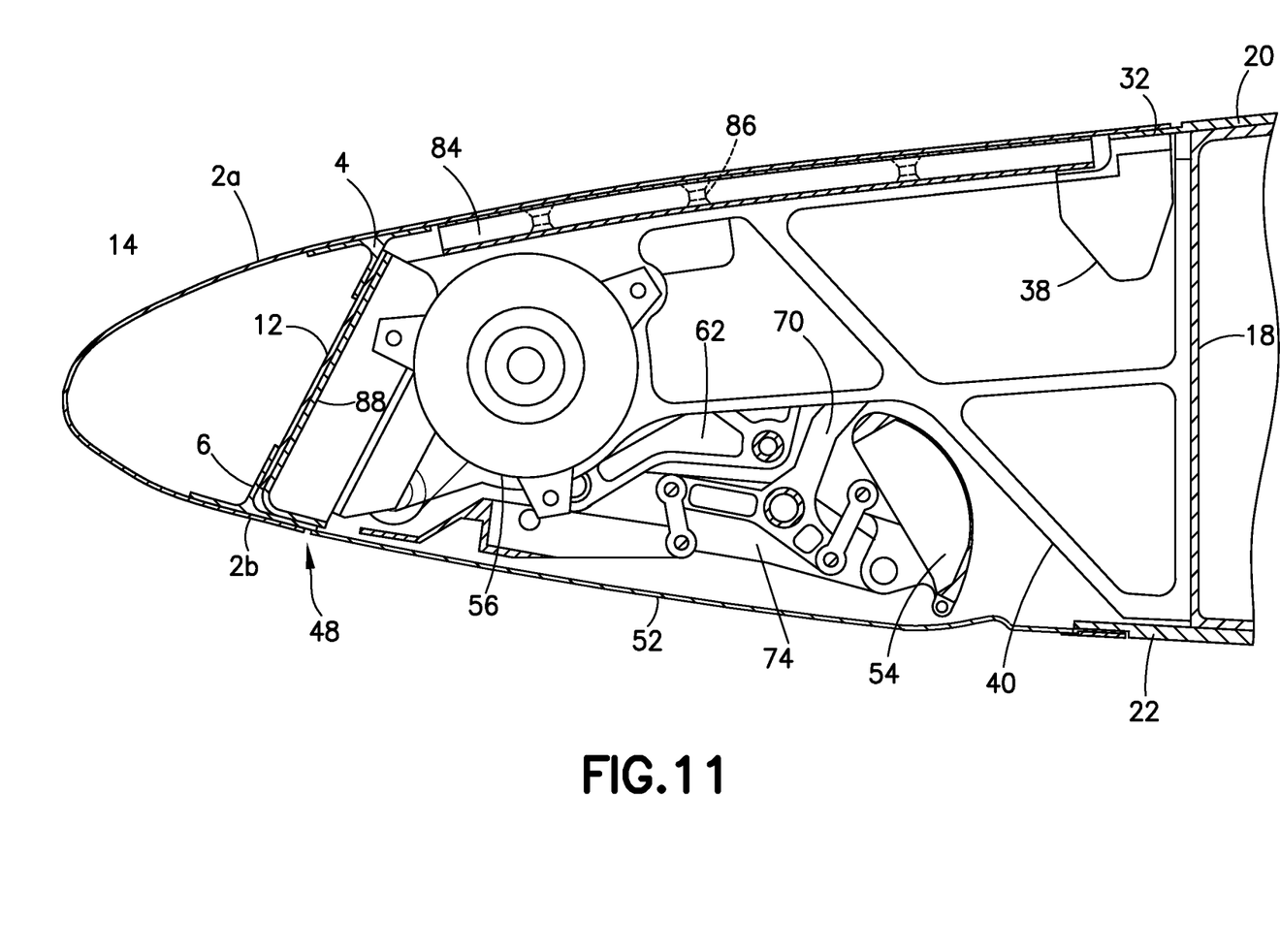
FIG. 11 is a diagram showing a side view of a wing leading edge assembly in accordance with an alternative embodiment. The Krueger flap is shown in a retracted position.

FIG. 11 shows a side view of a wing leading edge assembly in accordance with an alternative embodiment in which a composite panel (e.g., a honeycomb core panel 84) is used in place of stiffener members. In the example shown, the honeycomb core panel 84 is formed with a plurality of potted inserts 86 which accept fasteners for attaching the honeycomb core panel 84 to the ribs 40, 42. The upper portion 2a of the fixed leading edge skin panel 2 is bonded to the honeycomb core panel 84. Similar elements in FIGS. 6 and 11 bear the same reference numerals. FIG. 11 shows the Krueger flap in a retracted position. FIG. 11 also shows a nose beam clip 88, which is fastened to both the rib 40 and the nose beam web 12, thereby coupling rib 40 to nose beam web 12.

While wing leading edge assemblies have been described with reference to various embodiments, changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "fixedly coupled" means joined by methods other than bonding or welding, while the term "connected" means joined by bonding or welding. With regard to the term "means for stiffening", the corresponding structures disclosed hereinabove for performing the stiffening function include metal chords, metal stiffener members (a.k.a. stringers), honeycomb core panels, and equivalents thereof.

The invention claimed is:

1. A wing assembly comprising:
   a spar;
   an upper wing skin joined to said spar, said upper wing skin comprising a forward extension that extends forward of said spar and includes a mating surface offset from a surface of said upper wing skin;
   a first rib fixedly coupled to and projecting forward from said spar;
   a fixed leading edge skin panel fixedly coupled to said first rib, wherein said fixed leading edge skin panel comprises an upper portion and a lower portion;
   an upper chord connected to said upper portion of said fixed leading edge skin panel;
   a lower chord connected to said lower portion of said fixed leading edge skin panel; and
   a nose beam web fixedly coupled to said upper and lower chords, wherein said first rib is fixedly coupled to said nose beam web,
   wherein said upper portion of said fixed leading edge skin panel is integrally formed with said lower portion and has an aft edge portion that overlaps and is fastened to said forward extension such that a surface of the fixed leading edge skin panel is level with said surface of said upper wing skin.

2. The wing assembly as recited in claim 1, further comprising a shim disposed between said aft edge portion of said upper portion of said fixed leading edge skin panel and said forward extension of said upper wing skin.

3. The wing assembly as recited in claim 1, further comprising an insert made of polymeric material, said insert being disposed in a space bounded by an aft edge of said aft edge portion of said upper portion of said fixed leading edge skin panel, said forward extension of said upper wing skin, and an offset wall of said upper wing skin.

4. The wing assembly as recited in claim 1, further comprising a clip comprising a vertical portion fixedly coupled to said first rib and a horizontal portion fixedly coupled to said forward extension of said upper wing skin.

5. The wing assembly as recited in claim 1, further comprising a stiffener member fixedly coupled to said first rib and connected to said upper portion of said fixed leading edge skin panel, wherein said stiffener member comprises a web and a flange which meet at an intersection, said flange being tapered on both sides of said intersection.

6. The wing assembly as recited in claim 1, further comprising an upper chord connected to said upper portion of said fixed leading edge skin panel, wherein said upper chord comprises a web and a flange which meet at an intersection, said flange being tapered on both sides of said intersection.

7. The wing assembly as recited in claim 1, further comprising a plurality of vents formed by said lower portion of said fixed leading edge skin panel and said lower chord.

8. The wing assembly as recited in claim 7, wherein said lower chord comprises a plurality of channels, said vents being formed by said channels and opposing portions of said lower portion of said fixed leading edge skin panel.

9. The wing assembly as recited in claim 7, wherein said fixed leading edge skin panel and said nose beam web define a cavity in fluid communication with said vents, said wing assembly further comprising a duct in fluid communication with said cavity for coupling to a source of hot air.

10. The wing assembly as recited in claim 1, further comprising:
    a second rib fixedly coupled to said spar, to said nose beam web, and to said fixed leading edge skin panel;
    first and second bridge fittings fixedly coupled to and extending between said first and second ribs; and
    a Krueger flap assembly pivotably coupled to said first and second ribs, wherein said Krueger flap assembly comprises a movable lower leading edge skin panel and a mechanism that abuts said first bridge fitting when said movable lower leading edge panel is in an extended position and abuts said second bridge fitting when said movable lower leading edge skin panel is in a retracted position.

11. The wing assembly as recited in claim 10, wherein said lower chord has a cutout for clearance with said mechanism of said Krueger flap assembly when said movable lower leading edge skin panel is in said extended position.

12. The wing assembly as recited in claim 1, further comprising first and second pluralities of fasteners disposed along a left side edge and a right side edge, respectively, of said upper portion of said fixed leading edge skin panel, and a third plurality of fasteners disposed along an aft edge of said upper portion of said fixed leading edge skin panel.

13. A wing assembly comprising:
    a fixed leading edge skin panel comprising upper and lower portions;
    a bulkhead connected to said upper and lower portions of said fixed leading edge skin panel, wherein said bulkhead and said fixed leading edge skin panel define a cavity forward of said bulkhead, and said bulkhead comprises a lower flange connected to said lower portion of said fixed leading edge skin panel, said lower flange comprising a plurality of channels for venting air from said cavity;
    a bleed-air duct disposed within the cavity, said bleed-air duct comprising at least one opening;
    first and second ribs fixedly coupled to said bulkhead; and
    a Krueger flap assembly pivotably coupled to said first and second ribs, wherein said Krueger flap assembly comprises a movable lower leading edge skin panel having a forward portion that overlaps an aft portion of said lower chord when said movable lower leading edge skin panel is in a retracted position, and a mechanism capable of moving said movable lower leading edge skin panel from said retracted position to an extended position in response to actuation, wherein an aft edge of said lower portion of said fixed leading edge skin panel is separated from a forward edge of said movable lower leading edge skin panel by a gap when said movable lower leading edge skin panel is in said retracted position, said gap being in fluid communication with said plurality of channels.

14. The wing assembly as recited in claim 13, wherein said bulkhead further comprises an upper chord connected to said upper portion of said fixed leading edge skin panel, a lower chord connected to said lower portion of said fixed leading edge skin panel, and a nose beam web fixedly coupled to said upper and lower chords, wherein said lower flange is part of said lower chord.

15. A wing assembly comprising: a spar; first and second ribs fixedly coupled to and projecting forward from said spar; a fixed leading edge skin panel comprising upper and lower portions; an upper chord connected to said upper portion of said fixed leading edge skin panel; a lower chord connected to a lower portion of said fixed leading edge skin panel; a nose beam web fixedly coupled to said upper and lower chords and to said first and second ribs; and means for stiffening said wing assembly, said means for stiffening said wing assembly being connected to said upper portion of said fixed leading edge skin panel and fixedly coupled to said first and second ribs, and a Krueger flap assembly pivotably coupled to said first and second ribs, wherein said Krueger flap assembly comprises:

a movable lower leading edge skin panel having a forward portion that overlaps an aft portion of said lower chord when said movable lower leading edge skin panel is in a retracted position; and a mechanism capable of moving said movable lower leading edge skin panel from said retracted position to an extended position in response to actuation.

16. The wing assembly as recited in claim 15, wherein said means for stiffening are made of metal, bonded to said fixed leading edge skin panel, and fastened to said first and second ribs.

17. The wing assembly as recited in claim 15, wherein said means for stiffening are made of honeycomb core, bonded to said fixed leading edge skin panel, and fastened to said first and second ribs.

18. The wing assembly as recited in claim 15, wherein said upper chord comprises a web and a flange which meet at an intersection, said flange being tapered on both sides of said intersection.

* * * * *